(12) United States Patent
Bogenberger et al.

(10) Patent No.: US 8,373,435 B2
(45) Date of Patent: Feb. 12, 2013

(54) METHOD AND APPARATUS FOR HANDLING AN OUTPUT MISMATCH

(75) Inventors: Florian Bogenberger, Poing (DE); Christopher Temple, Munich (DE)

(73) Assignee: Freescale Semiconductor, Inc., Austin, TX (US)

(*) Notice: Subject to any disclaimer, the term of this patent is extended or adjusted under 35 U.S.C. 154(b) by 0 days.

(21) Appl. No.: 13/120,712

(22) PCT Filed: Sep. 30, 2008

(86) PCT No.: PCT/IB2008/053966
§ 371 (c)(1),
(2), (4) Date: Mar. 24, 2011

(87) PCT Pub. No.: WO2010/038096
PCT Pub. Date: Apr. 8, 2010

(65) Prior Publication Data
US 2011/0175643 A1      Jul. 21, 2011

(51) Int. Cl.
*H03K 17/16* (2006.01)
*H03K 19/003* (2006.01)

(52) U.S. Cl. .................. 326/21; 326/9; 326/14; 714/11; 714/13

(58) Field of Classification Search .................. 326/9–15; 714/10–13
See application file for complete search history.

(56) References Cited

U.S. PATENT DOCUMENTS

| | | | |
|---|---|---|---|
| 5,748,873 A | 5/1998 | Ohguro et al. | |
| 5,892,897 A | 4/1999 | Carlson et al. | |
| 5,993,055 A | 11/1999 | Williams | |
| 7,444,568 B2 | 10/2008 | Morrison et al. | |
| 2003/0061535 A1 | 3/2003 | Bickel | |
| 2004/0153763 A1* | 8/2004 | Grochowski et al. | 714/17 |
| 2007/0174687 A1* | 7/2007 | Graham et al. | 714/13 |
| 2011/0035750 A1* | 2/2011 | Bogenberger et al. | 718/102 |
| 2011/0066779 A1 | 3/2011 | Bogenberger et al. | |

FOREIGN PATENT DOCUMENTS

| | | |
|---|---|---|
| GB | 2430779 A | 4/2007 |
| WO | 01/46806 A | 6/2001 |
| WO | 2005/045664 A2 | 5/2005 |

OTHER PUBLICATIONS

Bondavalli A et al: "State Restoration in a COTS-Based N-Modular Architecture" Object-Oriented Real-time Distributed Computing, 1998. (ISORC 98) Proceedings. 1998 First International Symposium, Apr. 20-22, 1998, Kyoto, Japan, pp. 174-183.

Siewiorek Daniel P: "Architecture of Fault-Tolerant Computers: An Historical Perspective" Proceeding of the IEEE, vol. 79, No. 12, Dec. 1991, pp. 1710-1734.

International Search Report and Written Opinion correlating to PCT/IB2008/053966 dated Jun. 12, 2009.

* cited by examiner

*Primary Examiner* — Shawki Ismail
*Assistant Examiner* — Jany Tran

(57) ABSTRACT

A system comprises a first signal processing logic module and at least one further signal processing logic module. The system further comprises mismatch handler logic module arranged to detect a mismatch between outputs of the first and at least one further signal processing logic module, the mismatch between outputs indicating a failed operation. The mismatch handler logic module further arranged, upon detection of a mismatch between outputs of the first and at least one further signal processing logic module, to analyze internal states of the first and at least one further signal processing logic module, determine whether the cause of the output mismatch is due to a transient fault, and upon determination that the cause of the output mismatch is due to a transient fault, to re-synchronize the first and at least one further signal processing logic module.

16 Claims, 5 Drawing Sheets

METHOD AND APPARATUS FOR HANDLING AN OUTPUT MISMATCH

FIELD OF THE INVENTION

The field of this invention relates to a method and apparatus for handling an output mismatch, and in particular to a method and apparatus for handling a mismatch between outputs of a first signal processing unit and at least one further synchronous signal processing unit.

BACKGROUND OF THE INVENTION

In the field of safety applications, for example safety applications for automotive electronics, in order to satisfy reliability and/or functional safety requirements, it is known to utilize a redundant hardware architecture comprising, for example, two or more processing modules performing substantially the same operations synchronously. This is often referred to as operating in 'lock-step'. Outputs of the two processing modules are continuously monitored and compared with one another to detect mismatches in the outputs of the modules, and thus to detect faults therein. Such lock-step architectures provide useful capabilities for the detection of faults, when such faults have an impact on the output. Typically, upon detection of a mismatch, further execution of the particular application being executed is inhibited, with affected systems being placed into a 'safe' condition. For example, a safe condition may comprise a system state where the system is unable to trigger potentially dangerous operations. The safe state may be enforced by a system component that is out of the fault propagation domain of the detected fault (e.g. an external window watchdog). For systems that are not able to remain in a safe state, a typical approach is to reset and reboot them in order to re-synchronize the processing modules. This process can take from several hundred milliseconds up to several seconds, during which the system is unavailable, potentially creating a temporarily dangerous situation.

A major problem with the use of such architectures operating in lock-step is a 'lack of availability' of applications caused by their execution being inhibited due to a detected mismatch indicating a fault. Faults occurring during the execution of an application may be divided into classes of faults, for example:
  (i) permanent faults;
  (ii) intermittent faults; and
  (iii) transient faults.

Permanent faults may be defined as faults that, once present, are persistent and thus relatively constant (permanent) in nature. Permanent faults are typically caused by a physical defect of the hardware. Intermittent faults may be defined as faults that occur either periodically, or more commonly at irregular intervals. The cause of an intermittent fault is typically a result of several contributing factors occurring simultaneously. As a result, such faults can be difficult to detect since all contributing factors must be present in order to recreate the fault. Transient faults may be defined as temporary faults that occur during operation and disappear when the system is powered off or reset. Transient faults are typically caused by changes of data values without a physical defect of the hardware and may occur as a result of environmental conditions. Typically, transient faults occur much more frequently than permanent faults, and may typically be expected to occur in lock step architectures, approximately one hundred times more frequently than permanent faults.

Although known lock step architectures and techniques for processing modules operating in lock-step provide good detection capabilities for faults that have an impact on the output, they are not able to distinguish between the different classes of faults. In particular, they are unable to distinguish between permanent and transient faults. This is a severe limitation in lock step architectures as all faults will be treated the same. Thus, for any fault detected, the further execution of that particular application will typically be inhibited until a complete system reset of power-down has been performed, irrespective of the class of fault detected.

SUMMARY OF THE INVENTION

A system, a semiconductor device and a method for handling a mismatch between outputs of a first signal processing unit and at least one further signal processing unit as described in the accompanying claims.

Specific examples of the invention are set forth in the dependent claims.

These and other aspects of the invention will be apparent from and elucidated with reference to the examples described hereinafter.

BRIEF DESCRIPTION OF THE DRAWINGS

Further details, aspects and examples of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
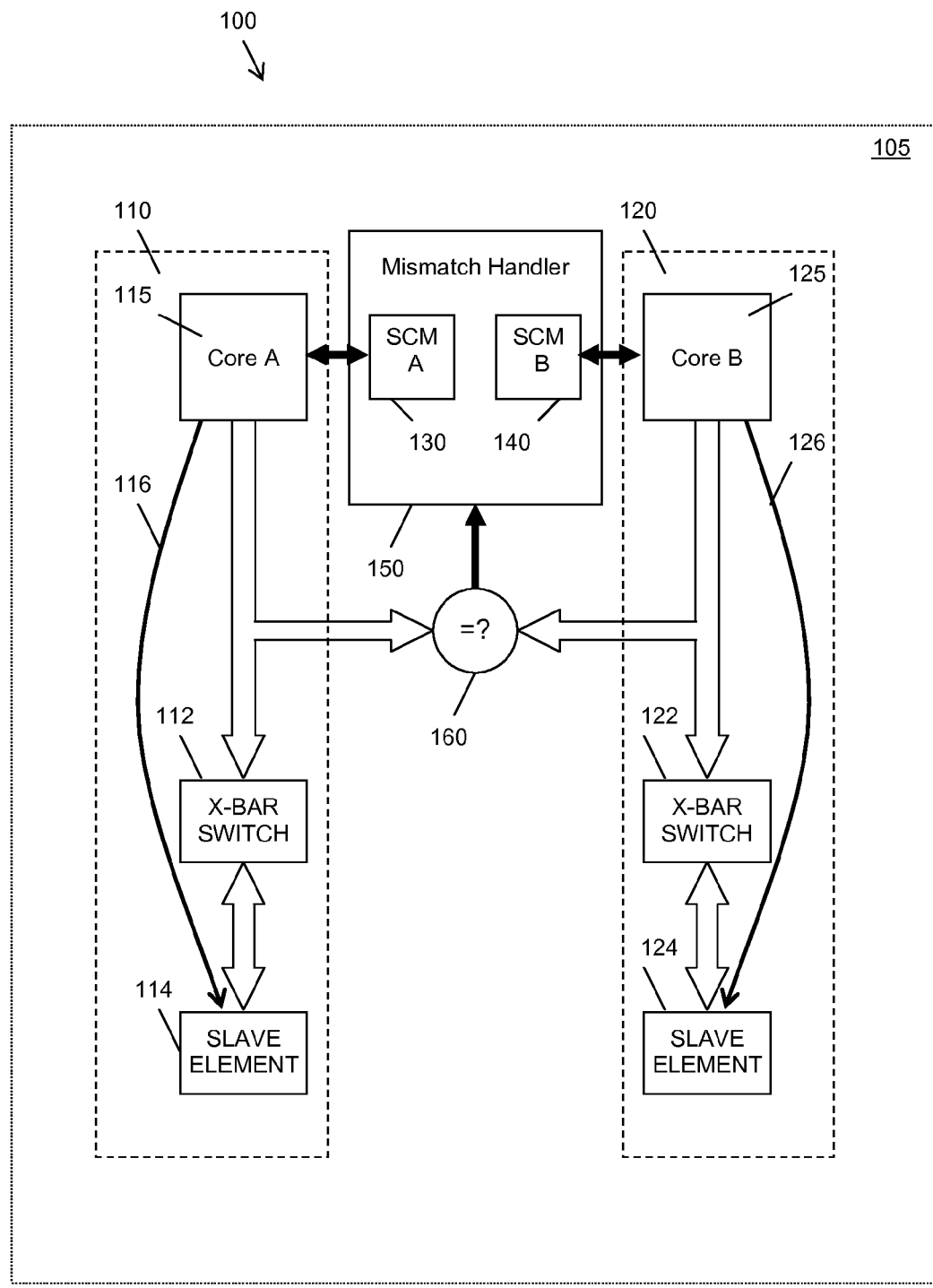
FIG. 1 illustrates an example of a data processing system.

Referring to FIG. 1, an example of a data processing system 100 is illustrated. The system 100 may be implemented in any suitable manner, for example by way of an integrated circuit situated on a semiconductor device 105. The system 100 comprises a first signal processing logic module, which for the illustrated example is in a form of processing core 'A' 115. The system 100 further comprises at least one further signal processing logic module, which for the illustrated example is in the form of processing core 'B' 125.

As previously mentioned, in the field of safety applications, for example safety applications for automotive electronics, in order to satisfy reliability and/or functional safety requirements, it is known to utilize a redundant hardware architecture comprising, for example, two or more processing logic modules performing substantially the same operations synchronously. As mentioned, this is often referred to as operating in 'lock-step'.

Accordingly, for the illustrated example, each of the signal processing logic modules 115, 125 forms a part of a data processing sub-system 110, 120. Each sub-system comprises a communication element, which for the illustrated example is in a form of a crossbar switch 112, 122, operably coupled between an output of the respective signal processing logic module 115, 125, and one or more slave elements 114, 124.

Thus, for the first data processing sub-system 110, the signal processing logic module 115 is operably coupled to its respective slave element 114 via a first data path 116. Similarly, for the second data processing sub-system 120, the signal processing logic module 125 is operably coupled to its respective slave element 124 via a second data path 126. In this manner, the data processing system 100 may be configured for the second sub-system to provide redundancy for the first sub-system, for example by way of processing core 'B' 125 operating in lock step with processing core 'A' 115.

The outputs of each of the processing cores 115, 125 are further operably coupled to mismatch detection logic module 160, which compares the outputs of the cores 115, 125 in order to detect a mismatch there between; such a mismatch between the outputs indicating a failed operation.

The data processing system 100 further comprises a mismatch handler logic module 150, which for the illustrated example is operably coupled to the mismatch detection logic module 160. In this manner, mismatch handler logic module 150 is arranged to detect a mismatch between the outputs of the first and at least one further signal processing units 115, 125. The mismatch handler logic module 150 is further arranged, upon detection of a mismatch between outputs of the first and at least one further signal processing units 115, 125, to analyze internal states of the first and at least one further signal processing logic module 115, 125. The mismatch handler logic 150 is further arranged to determine whether the cause of the output mismatch is due to a transient fault, and upon determination that the cause of the output mismatch is due to a transient fault, to re-synchronize the first and at least one further signal processing logic module 115, 125.

In this manner, when a transient fault is detected, rather than the system being transitioned to a safe state, as would be the case for known system architectures, the signal processing logic modules are re-synchronized, and the system is able to resume normal operation again, recovering from the detected mismatch. As previously mentioned, transient faults typically occur much more frequently than permanent faults, for example approximately one hundred times more frequently than permanent faults. Thus, by re-synchronizing the signal processing logic module, as opposed to transitioning the system into a safe state, when a transient fault is detected, the availability of the system is significantly improved, compared to known lock step architectures.

Furthermore, for systems that are unable to remain in a safe state, a traditional approach might be to reset and reboot the system in order to re-synchronize the signal processing logic modules. In the context of the examples described below, the term re-synchronize is meant to encompass an alignment of a previously deviated state of units, at a specific point in time, and from that point on operate the state of units in a synchronous manner to represent a state before the deviation occurred. This process can take from several hundred milliseconds up to several seconds, during which time the system is unavailable, potentially creating a temporarily dangerous situation. By comparison, re-synchronization of the signal processing logic modules as herein described may be achieved within from one to, say, one hundred microseconds, without the need to reset or reboot the whole system. As a result, the amount of time for which the system is unavailable may be significantly reduced.

For the illustrated example, the mismatch handler 150 of FIG. 1 comprises first state analyzer logic, which for the illustrated example is in a form of a State Checker Module (SCM) 'A' 130, and at least one further state analyzer logic module, which for the illustrated example is in a form of State Checker Module (SCM) 'B' 140. The first state analyzer logic module (SCM 'A') 130 is operably coupled to the first signal processing logic module (core 'A') 115, whilst the at least one further state analyzer logic module (SCM 'B') 140 is operably coupled to the at least one further signal processing logic module (core 'B') 125. The first and at least one further state analyzer logic module 130, 140 are each arranged, upon detection of a mismatch between outputs of the first and at least one further signal processing logic module 115, 125, to analyze an internal state of the first and at least one further signal processing units 115, 125 respectively.

Figure 2:
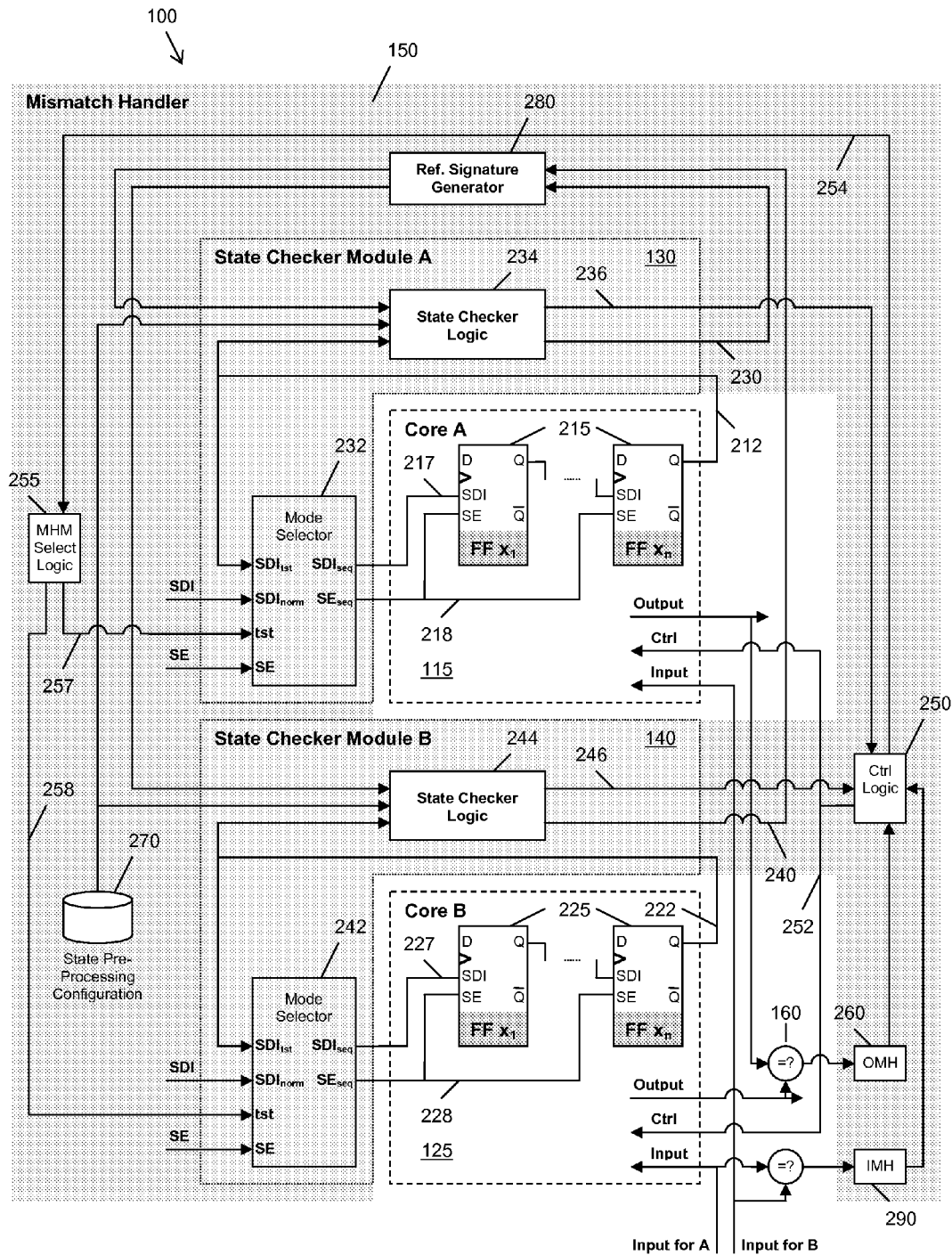
FIG. 2 illustrates an example of a mismatch handler logic module.

Referring now to FIG. 2, the mismatch handler logic module 150 of FIG. 1 is illustrated in greater detail. For the illustrated example, the mismatch handler logic module 150 comprises output mismatch handler (OMH) logic module 260, operably coupled to the mismatch detection logic module 160. OMH logic module 260 may be further operably coupled to control logic module 250. In this manner, upon detection of a mismatch between the outputs of Core 'A' 115 and Core 'B' 125, the mismatch detection logic module 160 provides an indication to the OMH logic module 160 of the detection of such an output mismatch. OMH logic module 160, upon receipt of an indication that a mismatch has been detected, signals the detection of the output mismatch to the control logic module 250.

The control logic module 250 may be arranged, upon receipt of a signal from the OMH logic module 260 indicating that an output mismatch has been detected, to put the two signal processing logic module, Core 'A' 115 and Core 'B' 125, into a mismatch handling mode by way of a control signal 252. In this manner, upon detection of an output mismatch, indicating the occurrence of a fault, Core 'A' 115 and Core 'B' 125 are put into a mismatch handling mode in which normal operation is suspended. The control logic module 250 also instructs mismatch handling mode select logic module 255, via signal 254, to put the state checker modules (SCMs) 130, 140 into mismatch handling mode. Upon receipt of such an instruction, the mismatch handling mode (MHM) select logic module 255 initializes the mismatch handling mode for SCM 'A' 130 and SCM 'B' 140 via mismatch handling mode control signal 257 and 258 respectively.

SCM 'A' 130 and SCM 'B' 140 each comprise state checker logic module 234, 244 respectively. The state checker logic module 234, 244 operably coupled to Core 'A' 115 and Core 'B' 125 respectively, are arranged, upon initialization by mismatch handling mode select logic module 255, to analyze internal states of Core 'A' 115 and Core 'B' 125. Further, state checker logic module 234, 244 may be arranged to generate state signature values 230, 240 representative of the internal states of Core 'A' 115 and Core 'B' 125 respectively.

In accordance with some examples of the invention, each of the first signal processing unit (Core 'A') 115 and at least one further signal processing unit (Core 'B') 125 comprises a plurality of flip-flop elements 215, 225 arranged to form one or more scan chains, at least when the respective signal processing unit 115, 125 is configured to operate in a mismatch handling mode.

As will be appreciated, in the case where flip-flop elements 215, 225 are arranged to form a plurality of scan chains, the scan chains are typically arranged to operate substantially in parallel. For simplicity, each signal processing unit will herein after be described and illustrated as comprising a single scan chain. However, it will be appreciated that each signal processing unit may comprise one or more scan chains operating substantially in parallel, and as such the term 'scan chain' herein after used is intended to apply equally to a plurality of scan chains.

As will also be appreciated, a scan chain provides a means to set and observe flip-flop elements within an integrated circuit. In particular, when a scan enable signal is asserted, which for the illustrated example may comprise the mismatch handling mode control signal 252, the flip-flop elements are operably coupled into a shift register configuration, whereby the output of one flip-flop element may be operably coupled to the input of the next flip-flop element. Typically, the output of the last flip-flop element in the chain may be externally accessible to enable data from that flip-flop element to be externally read. Furthermore, the input of the first flip-flop element in the chain may also be externally accessible to enable data to be introduced into the chain. In this manner, the state of the last flip-flop in the chain may be read. Then, using the integrated circuit's clock signal, the flip-flop states can be shifted along in order to enable the original state of each flip-flop to be read successively. In a similar manner, an arbitrary pattern may be fed into the chain of flip-flops in order to set the state of each flip-flop.

Referring back to FIG. 2, and as previously mentioned, SCM 'A' 130 and SCM 'B' 140 each comprise state checker logic module 234, 244 respectively, the state checker logic module 234, 244 operably coupled to Core 'A' 115 and Core 'B' 125 respectively, and arranged, upon initialization by mismatch handling mode select logic 255, to analyze internal states of Core 'A' 115 and Core 'B' 125 respectively, and to generate state signature values 230, 240 representative of the internal states of Core 'A' 115 and Core 'B' 125 respectively. More particularly, each state checker logic module 234, 244 may be operably coupled to an output 212, 222 of the last flip-flop element 215, 225 in the scan chain of the respective core 115, 125.

SCM 'A' 130 and SCM 'B' 140 each further comprise mode selector logic module 232, 242, operably coupled to an input 217, 227 of the first flip-flop element 215, 225 in the scan chain of the respective core 115, 125. Each mode selector logic module 232, 242 may be further operably coupled to a clock enable 218, 228 for each of the respective flip-flop elements 215, 225. In this manner, each mode selector logic module 232, 242 may be able to introduce a state into the input of the respective scan chain, and to apply a clock signal to the flip-flop elements 215, 225 respectively to cause the flip-flop states to shift along the respective scan chains.

Each mode selector logic module 232, 242 may be operably coupled to the mismatch handling mode select logic module 255, and arranged to receive the mismatch handling mode control signal 257, 258 respectively. In this manner, upon initialization of a mismatch handling mode by way of mismatch handling mode control signal 257, 258, each mode selector logic module 232, 242 may be arranged to cause the states of the flip-flop elements 215, 225 to incrementally shift through the respective scan chain. In this manner, each state checker logic module 234, 244 may be able to read the state of each flip-flop element within the respective scan chain as the states are shifted through the scan chain. Thus, each state checker logic module 234, 244 may be able to generate a state signature value 230, 240 based on the states of the respective flip-flop elements 215, 225. The output 212, 222 of the last flip-flop element 215, 225 in the scan chain of each core 115, 125 may be looped back to the respective mode selector logic module. In this manner, the state of the last flip-flop element in the scan chain may be fed back into the first flip-flop element of the scan chain. As a result, the states of the flip-flop elements may be cycled through until the flip-flop elements return to their original states. In this manner, the internal state of the core is not changed.

For the illustrated example, the state signature value 230, representative of the internal state of Core 'A' 115, may be provided, via reference signature generator logic module 280, to the state checker logic module 244 of SCM 'B' 140. Similarly, the state signature value 240, representative of the internal state of Core 'B' 125 may be provided, via reference signature generator logic 280, to the state checker logic module 234 of SCM A 130. In this manner, each state checker logic 234, 244 may be able to compare the state signature values 230, 240 in order to determine whether the internal states of Core 'A' 115 and Core 'B' 125 match. The result of this comparison may then be provided back to the control logic module 250.

If it is determined that there is no mismatch between the internal states of Core 'A' 115 and Core 'B' 125, it is likely that the output mismatch originally detected may be due to a transient fault. Accordingly, upon the comparison of the internal states of, for the illustrated example, Core 'A' 115 and Core 'B' 125 determining matching internal states for Core 'A' 115 and Core 'B' 125, the mismatch handler logic module 150 may be arranged to cause Core 'A' 115 and Core 'B' 125 to re-execute the failed operation, for example by way of control signal 252. In this manner, the mismatch handler logic module 150 may be able to re-synchronize Core 'A' 115 and Core 'B' 125, and enable the system to resume normal operations following such a transient fault. As will be appreciated for the illustrated example, both state checker logic modules 130, 140 are provided with the state signature value for the internal state of the opposing Core 125, 115 respectively. Thus, they are both able to perform the comparison of the internal states of the Core 'A' and Core 'B' 115, 125. However, in accordance with alternative examples, only one of the state checker module 130, 140 may be arranged to perform such a comparison.

In accordance with some examples of the invention, upon re-execution of the failed operation, if the mismatch handler logic module 150 detects a further mismatch between outputs of the first (e.g. Core 'A' 115) and at least one further (e.g. Core 'B' 125) signal processing logic module, the mismatch handler logic module 150 may be further arranged to determine that the output mismatch is not due to a transient fault. Accordingly, upon detection of the further output mismatch following re-execution of the failed operation, the mismatch handler logic module 150 may be arranged to transition the system into a safe state. A safe state may comprise a system state where the system is unable to trigger potentially dangerous operations. The safe state may be enforced by a system component that is out of the fault propagation domain of the detected fault, such as an external window watchdog.

Referring back to the comparison of the state signature values 230, 240 by each state checker logic module 234, 244, if it is determined that a mismatch has occurred between the internal states of Core 'A' 115 and Core 'B' 125, the mismatch handler logic module 150 may be arranged to determine whether the mismatch between the internal states of Core 'A' 115 and Core 'B' 125 may be caused by a transient fault, and, thus, whether the output mismatch may be caused by a transient fault.

For example, upon the comparison of the internal states of Core 'A' 115 and Core 'B' 125 determining a mismatch of internal states for the Core 'A' 115 and Core 'B' 125, the state checker logic modules 130, 140 may be arranged to identify a location of fault(s) causing the mismatch within Core 'A' 115 and Core B 125, compare the mismatch with previously detected mismatches. If a comparable mismatch has not previously been detected, the state checker logic modules 130, 140 may also be arranged to determine a mismatch within Core 'A' 115 and Core 'B' 125, and thereby that there may be an output mismatch caused by a transient fault, as described in greater detail below with reference to FIG. 3. If it is determined that the mismatch within Core 'A' 115 and Core 'B' 125, and thereby that there may be an output mismatch caused by a transient fault, the mismatch handler logic module 150 may subsequently be arranged to re-synchronize the Core 'A' 115 and Core 'B' 125, as described in greater detail below with reference to FIG's 4 and 5, and enabling the system 100 to resume normal operation once again. Conversely, if it is determined that the mismatch may be within Core 'A' 115 and Core 'B' 125, and thereby that there may be an output mismatch caused by a non-transient fault, such as a permanent or intermittent fault, the mismatch handler logic module 150 may be arranged to transition the system 100 into a safe state.

For the illustrated example, the output 212, 222 of the last flip-flop element 215, 225 in the scan chain of each core 115, 125 may be operably coupled to the input 217, 227 of the first flip-flop element 215, 225 in the respective scan chain, via the respective mode selector logic module 232, 242. In this manner, each mode selector logic module 232, 242 may be arranged to loop the state value from the last flip-flop element in each scan chain back to the first flip-flop element of the respective scan chain. Thus, after the application of n clock signals to the clock enable logical module 218, 228 inputs of each flip-flop element 215, where n is divisible by (e.g. equals) the number of flip-flop elements in a scan-chain, all flip-flop states will have been received by the respective mode selector logic module 232, 242, and each flip-flop element will comprise its original state at the moment the respective core 115, 125 was put into mismatch handling mode.

Figure 3:
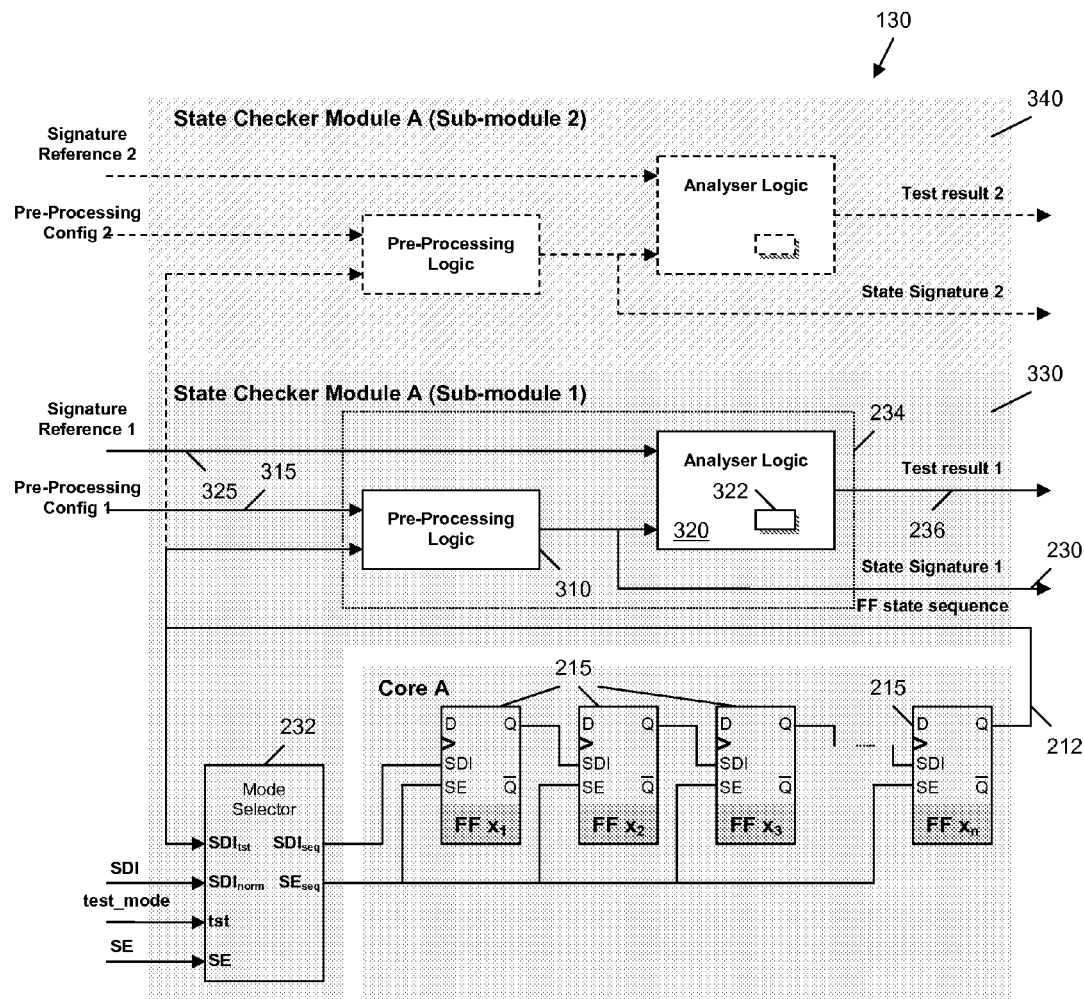
FIG. 3 illustrates an example of a state analyzer logic module.

Referring now to FIG. 3, there is illustrated in greater detail an example of a state analyzer logic module. For the illustrated example, the state analyzer logic module of FIG. 3 is in a form of a state checker logic module (SCM) 'A' 130.

As previously mentioned, SCM 'A' 130 comprises state checker logic module 234 operably coupled to Core 'A' 115, and arranged, upon initialization by mismatch handling mode select logic module 255 (of FIG. 2), to analyze internal states of Core 'A' 115, and to generate a state signature value 230 representative of the internal state of Core 'A' 115.

More particularly for the example illustrated in FIG. 3, state checker logic 234 comprises pre-processing logic 310 operably coupled to an output 212 of the last flip-flop element 215 in the scan chain of Core 'A'. Pre-processing logic module 310 may be arranged to receive state values from the flip-flop elements 215 as they are cycled through their scan chain, and to generate the state signature value 230 based on the states of the respective flip-flop elements 215. For the illustrated examples, the pre-processing logic module 310 may be further arranged to receive state pre-processing configuration information 315, for example from a state pre-processing configuration data store 270 (of FIG. 2). The pre-processing configuration information 315 may be configured to substantially define how the pre-processing logic module 310 generates the state signature value 230 based on the states of the respective flip-flop elements 215. In this manner, the pre-processing logic module 310 may be configured with respect to how it generates the state signature value 230. For example, the pre-processing configuration information 315 may comprise information defining how the pre-processing logic module 310 may order, group, mask and/or compress the flip-flop element state values in order to generate the state signature value 230. In this manner, the pre-processing logic module 310 may be able to represent the n state values of the flip-flop elements 215 in the form of a manageable and useful state signature value 230.

For example, as will be appreciated by a skilled artisan, a typical processing core may comprise many sub-modules, such as an instruction decoder, pipeline, multiplier, divider, etc. Furthermore, there is typically a certain sequence in the core logic corresponding to the data propagating through the modules cycle by cycle. However, the sequence of the flip-flop elements in the scan chain usually neither follows the module structures, nor the logical sequence of the data propagation. As a result, the flip-flop element values are typically not consecutive within the scan chain. During the pre-processing, the flip-flop element values may be re-ordered and grouped in such a manner as to facilitate state analysis. For example, all values from flip-flop elements relating to, say, a multiplier sub-module may be arranged into one group, and likewise all values from flip-flop elements relating to other sub-modules may be arranged into further sub-module groups.

Furthermore, sometimes the value of individual flip-flop elements may not be of interest, or may even be counterproductive for a subsequent state analysis operation, for example if their values cannot be predicted. Accordingly, values for these individual flip-flop elements may be masked, or simply discarded and ignored for the purpose of generating the state signature value 230.

As previously mentioned, and depending on the purpose of the state signature value 230, the flip-flop element values may be compressed. For example, if the subsequent state analysis operation may be limited to a 32-bit vector, the flip-flop element values, which may comprise several kilobytes of information, may be fed into a Multiple Input Shift Register (MISR) structure, which has a structure similar to a cyclic redundancy check (CRC) generation logic arranged to generate a signature from input data. As will be appreciated, the use of such a MISR structure may inhibit the location of potential faults. To overcome this, the MISR-like compression may be applied only for values representing specific registers (e.g. all General Purpose Registers (GPRs)) or to compress only within one group (e.g. all values belonging to a divider sub-module). In this manner, the location of a potential fault may be more easily identified to a specific sub-module or register. In addition, the state signature value 230 may comprise a plurality of, say, 32-bit state signature vectors, for example representative of different sub-modules and/or registers. In this manner, a subsequent state analysis operation may perform a plurality of comparisons using the individual 32-bit state signature vectors.

Referring back to FIG. 3, and as previously mentioned, the state signature value 230 may be made available externally with respect to the SCM 'A' 130, and for the example illustrated in FIG. 2 is provided to SCM 'B' 140 operating in parallel with respect to Core 'B' 125, via reference signature generator logic module 280. For the example illustrated in FIG. 3, the SCM 'A' 130 further comprises analyzer logic module 320 arranged to receive the state signature value 230 generated by pre-processing logic 310. Analyzer logic module 320 may be further arranged to receive a signature reference 325, which for the example illustrated in FIG. 2 is provided by the reference signature generator logic module 280. In this manner, the analyzer logic module 320 may be able to compare the state signature value 230 with the signature reference 325. The analyzer logic module 320 outputs a test result signal 236, which for the example illustrated in FIG. 2 is provided to the control logic module 250, indicating a result of the comparison.

For example, the signature reference 325 may comprise the state signature value 240 for Core 'B' 125 of FIG. 2. In this manner, the analyzer logic module 320 may be arranged to compare the two state signature values 230, 240 in order to determine whether or not there may be a mismatch between the internal states of the two cores 115, 125.

Alternatively, the reference signature generator 280 may be configured to provide the analyzer logic module 320 with a reference signature representative of an expected state for the Core 'A' 115. In this manner, the internal state of Core 'A' 115 may be checked against this expected state to determine whether or not the state of Core 'A' 115 should be considered to be correct, or whether a fault has occurred, irrespective of the state of any other core operating in redundantly, such as Core 'B' 125. As will be appreciated this functionality enables faults to be detected, even if no mismatch is detected at the outputs of the cores 115, 125. Accordingly, mismatch handler logic module 150 may be arranged to periodically initiate a mismatch handling mode, whereby the internal states of the cores 115, 125 may be compared to expected states. Alternatively, the mismatch handler logic module 150 may be arranged to initiate such a mismatch handling mode upon certain events occurring. For example, mismatch handling mode interrupts may be implemented within programmes to be executed by the, or each, core 115, 125, whereby such interrupts cause the mismatch handler logic module 150 to initiate a mismatch handling mode.

For the examples above, a simple bit-by-bit comparison may be sufficient for the purpose of comparing the state signature value 230 to a reference signature. However, it is contemplated that more complex algorithms may be implemented by the analyzer logic module 320. For example, the analyzer logic module 320 may be arranged to perform plausibility checks on the state signature value 230. For example, the analyzer logic module 320 may be arranged to determine whether specific addresses held by registers within Core 'A' 115 are within a legal range, where information relating to the addresses to check and the legal range for those addresses may be encoded within the signature reference 325.

Alternatively, the analyzer logic module 320 may be arranged to check that specific subsets of the states of the flip-flop elements 215 are correctly aligned with one another. For example, sub-modules within Core 'A' 115 may comprise flip-flop elements that replicate data, for example in a form of registers that are arranged to store the replicated data following execution of particular instructions.

As previously mentioned, the mismatch handler logic module 150 may be arranged to determine whether a mismatch at the output of the cores 115, 125 may be a result of a transient fault. As also previously mentioned, the analyzer logic module 320 may be arranged to compare the two state signature values 230, 240 in order to determine whether or not there may be a mismatch between the internal states of the two cores 115, 125. In this manner, if it is determined that there may be no mismatch between the internal states of the two cores 115, 125, it may be assumed that the fault causing the output mismatch may be a transient fault. However if it is determined that there may be a mismatch between the internal states of the two cores 115, 125, it would be advantageous to determine whether the internal mismatch may be due to a transient fault, or to a permanent fault or intermittent fault.

Thus, and in accordance with some examples of the invention, the analyzer logic module 320 may also be arranged, upon determination that there may be a mismatch between the internal states of the Core 'A' 115 and at least one other core, such as Core 'B' 125, to compare information relating to the internal state of the Core 'A' 115 with information relating to internal states from previously detected internal mismatches. For example, a mismatch may be mapped to a location and/or module within the/each core, and the location and/or module in which the mismatch occurs may be compared to locations and/or modules in which previous mismatches had been detected. If the internal state of the Core 'A' 115 is comparable with an internal state from a previously detected internal mismatch, it may be assumed that the fault that caused the mismatch may be not a transient fault. Accordingly, if the analyzer logic module 320 determines that the internal state of the Core 'A' 115 is comparable with an internal state from a previously detected internal mismatch, the analyzer logic module 320 may be arranged to provide an indication to the controller logic module 250 (of FIG. 2) that the mismatch may be not caused by a transient fault. Accordingly, the mismatch handler logic module 150 may subsequently cause the system 100 to transition to a safe state.

For the illustrated example, the analyzer logic module 320 comprises, or is operably coupled to, a memory element 322, and may be arranged, upon detecting a mismatch between the internal states of the Core 'A' 115 and Core 'B' 125, to store information relating to the internal state of the Core 'A' 115. For example, the analyzer logic module 320 may store the entire state signature value 230. In this manner, the state signature value 230 may be stored for future reference, as well as for later processing steps and to facilitate comparison with the state of other hardware modules that are operating in parallel. In particular, such storage of the state signature value 230 facilitates in the distinguishing of transient faults from permanent/intermittent faults.

In accordance with some examples of the invention, the analyzer logic module 320 may be arranged, following comparison of the state signature values 230, 240, to identify a location of fault(s) causing the mismatch within the cores 115, 125. For example, as previously mentioned, values from flip-flop elements relating to sub-modules such as multiplier sub-modules and divider sub-modules, may be arranged into sub-module groups. In this manner, the analyzer logic module 320 may be arranged to identify within which sub-module group of values the mismatch is located, and thereby identify within which sub-module the mismatch is located. The analyzer logic module 320 may then be arranged to only compare the values for the sub-module within which the mismatch is located, with values from previously detected internal mismatches that related to that same sub-module. In this manner, if mismatches occur frequently within the same sub-module, it may be assumed that the fault may be not a transient fault.

As will be appreciated, the examples described above for the analyzer logic module 320 determining whether an internal mismatch may be due to a transient fault are by no means exhaustive, and any known or future algorithms that would enable the analyzer logic 320 may equally be implemented.

Additionally, for the example illustrated in FIGS. 1 and 2, only two signal processing logic module in the forms of Core 'A' 115 and Core 'B' 125 are illustrated, and described above, it will be appreciated that the system 100 may equally comprise three or more signal processing logic module operating redundantly with one another, for example whereby a majority voting principle is applied as is known in the art. Accordingly, and as illustrated in FIG. 3, the SCM 'A' 130 may comprise one or more sub-modules, one for each signal processing logic module operating redundantly with Core 'A' 115. For the example illustrated in FIG. 3, the SCM 'A' 130 comprises a first sub-module 330 comprising state checker logic 234, as described above, arranged to provide analysis of the internal state of Core 'A' 115 with respect to a first redundant signal processing logic module, such as Core 'B' 125. The SCM 'A' 130 of FIG. 3 may further comprise a second sub-module 340 comprising state checker logic module 350, arranged to provide analysis of the internal state of Core 'A' 115 with respect to a second redundant signal processing logic module (not shown).

As previously mentioned, following the detection of an output mismatch between the internals states of Core 'A' 115 and Core 'B' 125, the mismatch handler logical module 150 may be arranged to re-synchronize the cores 115, 125. In this manner, the system 100 may resume normal operation. As will be appreciated if the output mismatch is as a result of a mismatch between the internal states of the cores 115, 125, in order to re-synchronize the cores 115, 125 it is necessary for the internal state of one or both to be changed in order for any mismatch to be corrected.

As also previously mentioned, each state checker logic module 130, 140 comprises a selector logic module 232, 242 operably coupled to the input 217, 227 of the first flip-flop element 215, 225 in the scan chain of the respective core 115, 125. Each mode selector logic module 232, 242 may be further operably coupled to a clock enable 218, 228 for each of the respective flip-flop elements 215, 225. In this manner, each mode selector logic module 232, 242 may be able to introduce a state into the input of the respective scan chain, and to apply a clock signal to the flip-flop elements 215, 225 respectively to cause the flip-flop states to shift along the respective scan chains.

Furthermore, the output 212, 222 of the last flip-flop element 215, 225 in the scan chain of each core 115, 125 may be operably coupled to the input 217, 227 of the first flip-flop element 215, 225 in the respective scan chain, via the respective mode selector logic module 232, 242. In this manner, each mode selector logic module 232, 242 may be arranged to loop the state value from the last flip-flop element in each scan chain back to the first flip-flop element of the respective scan chain. Thus, after the application of n clock signals to the clock enable 218, 228 inputs of each flip-flop element 215, where n is divisible by (e.g. equals) the number of flip-flop elements in a scan-chain, all flip-flop states will have been received by the respective mode selector logic module 232, 242, and each flip-flop element will comprise its original state at the moment the respective core 115, 125 was put into mismatch handling mode.

However, and in accordance with some examples of the invention, each mode selector logic module 232, 242 may be arranged to provide state values other than those from the output of the last flip-flop element in the respective scan chain to the first flip-flop element of the respective scan chain. Accordingly, each mode selector logic module 232, 242 may 're-load' its respective core 115, 125 with different state values, for example in order to correct a mismatch between the internal states of the cores.

Figure 4:
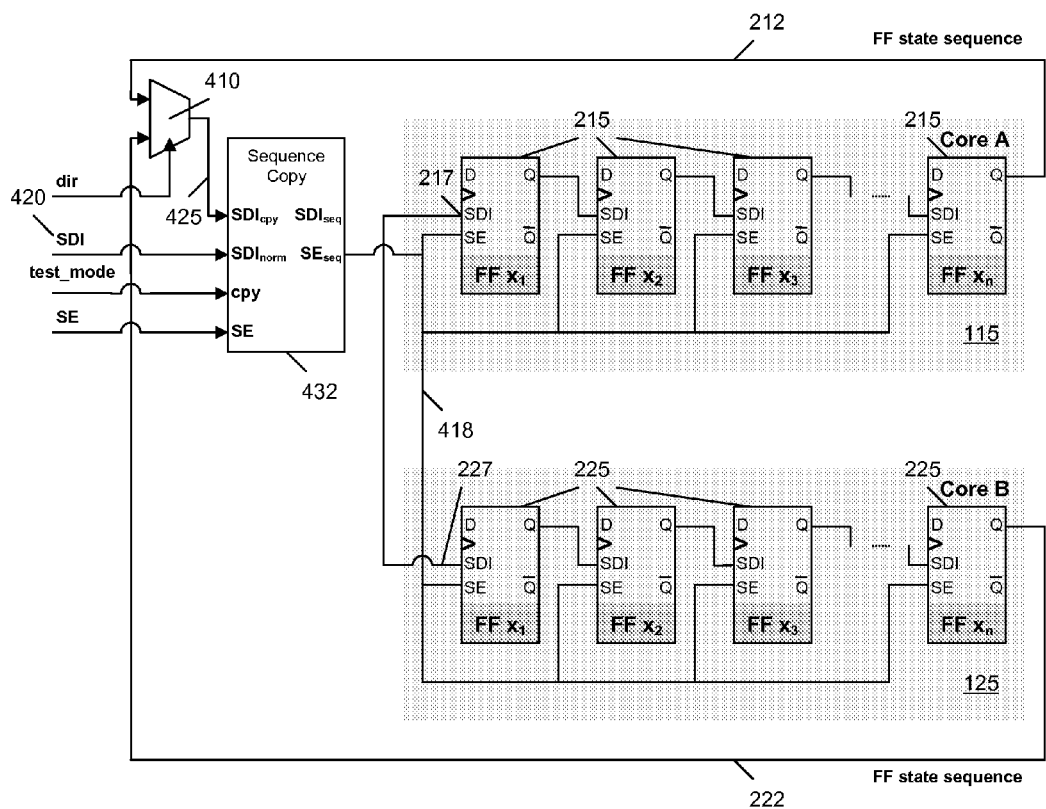
FIG. 4 illustrates an example of a part of the mismatch handler logic of FIG. 2.

Referring now to FIG. 4, there is illustrated a further example of part of the mismatch handler 150 arranged to synchronize the cores 115, 125. For the illustrated example, sequence copy logic module 432 may be operably coupled to an input 217, 227 of the first flip-flop element 215, 225 in the scan chain of each core 115, 125. The sequence copy logic 432 may be further operably coupled to a clock enable 418 for each of the respective flip-flop elements 215, 225. In this manner, the sequence copy logic module 432 may be able to introduce a state into the input of each scan chain, and to apply a clock signal to the flip-flop elements 215, 225 respectively to cause the flip-flop states to shift along the scan chains. In this manner, the sequence copy logic module 432 may be able to re-synchronize the internal states of the cores 115, 125.

In accordance with some examples of the invention, an input of the sequence copy logic module 432 may be operably coupled to a Scan Data In (SDI) signal 420. In this manner, the sequence copy logic module 432 may be provided with a sequence of values to input into the scan chains.

In accordance with some additional and/or alternative examples of the invention, and as illustrated in FIG. 4, the sequence copy logic module 432 may be operably coupled to one or each of the outputs of the last flip-flop elements 215, 225 in the scan chains. In this manner, the sequence copy logic module 432 may be able to use a sequence of internal state values from the output of one of the scan chains as the sequence of values to input into the scan chains in order to re-synchronize the internal states of the cores 115, 125. For example, and as illustrated in FIG. 4, an SDI input 425 of the sequence copy logic module 432 may be operably coupled to an output of a multiplexer 410. Inputs of the multiplexer 410 are operably coupled to each of the outputs of the last flip-flop elements 215, 225 in the scan chains. In this manner, the SDI input 425 may be selectively operably coupled to the outputs of the last flip-fop element in one of the scan chains, as required in order to re-synchronize the internal states of the cores 115, 125.

Referring back to FIG. 2, for the illustrated example, the mismatch handler logic module 150 may further comprise input mismatch handler (IMH) logic module 290. In this manner, mismatches occurring externally to the signal processing cores 115, 125 are prevented from propagating into their sphere of replication. For example, if the IMH logic module 290 detects a mismatch of incoming signals it may trigger a repetition of the operation or force the signal processing cores 115, 125 to not use the mismatching values, and initiate an appropriate error handling procedure.

Figure 5:
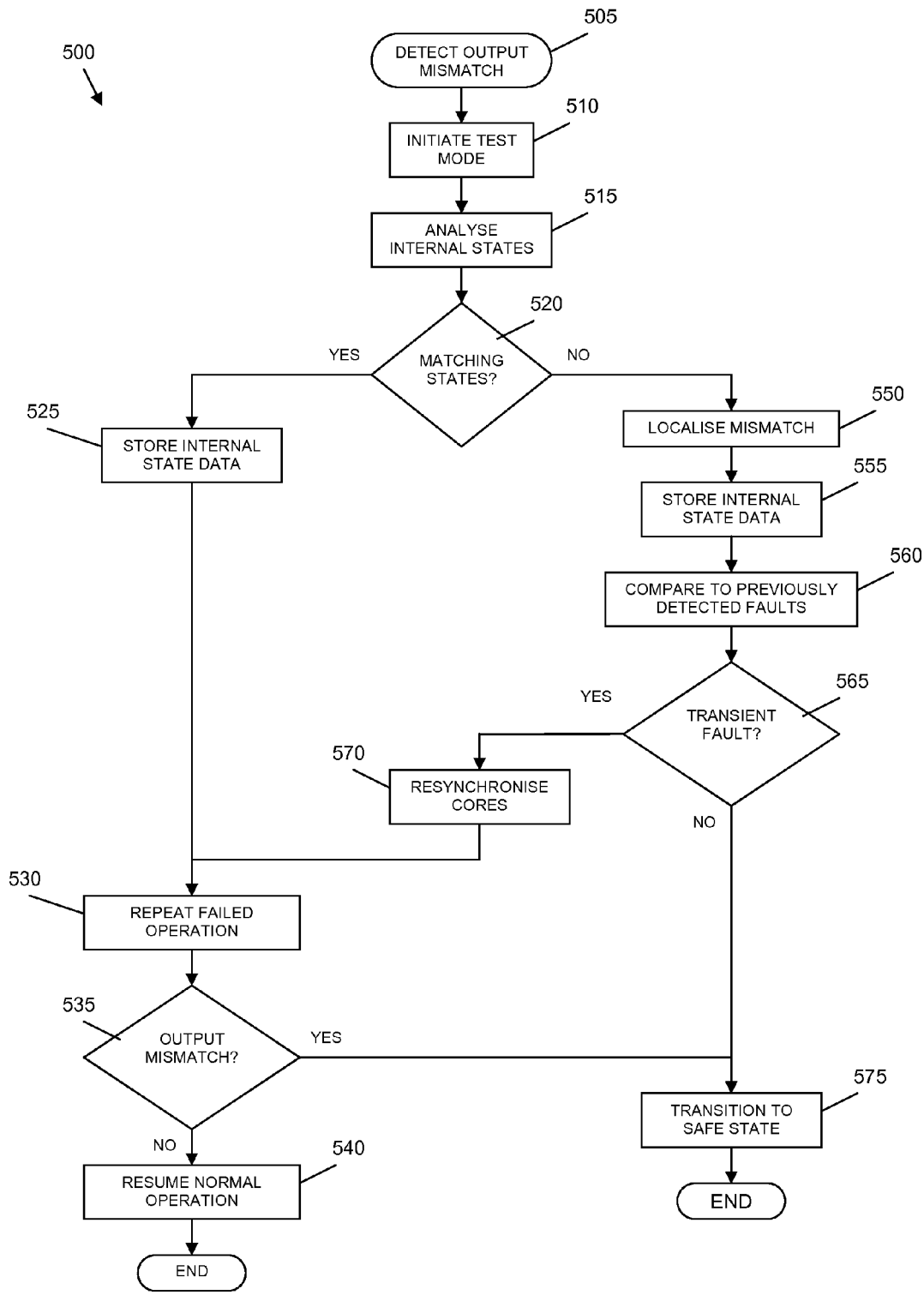
FIG. 5 illustrates a simplified flowchart of an example of a method for handling a mismatch between outputs of a first signal processing unit and at least one further signal processing unit.

Referring now to FIG. 5, there is illustrated a simplified flowchart 500 of an example of a method for handling a mismatch between outputs of a first signal processing logic module and at least one further signal processing logic module according to some examples of the invention. The method starts at step 505 with the detection of a mismatch between outputs of the first and at least one further signal processing logic module. Next, in step 510, a mismatch handling mode may be initiated whereby the first and at least one further signal processing logic module caused to operate in a mismatch handling mode whereby normal operation may be suspended. Next, in step 515, the internal states of the first and at least one further signal processing logic module are analyzed, and it may then be determined whether the internal states of the first and at least one further signal processing logic module are matching, in step 520.

If the internal states of the first and at least one further signal processing logic module are matching, it may be assumed that the output mismatch is due to likely to be caused by a transient fault. Accordingly, the method moves to step 525, where data relating to the internal states of the signal processing logic module may be stored. Next, in step 530, the operation that failed, which caused the output mismatch, may be repeated. If a further output mismatch is detected following the repeat of the failed operation, in step 535, it may be assumed that the fault causing the output mismatch is in fact not transient, and the method moves to step 575, where the system comprising the signal processing logic module may be transitioned to a safe state. The method then ends.

Referring back to step 535, if no output mismatch is detected following the repeat of the failed operation, it may be assumed that the fault causing the detected output mismatch was in fact a transient fault. Accordingly, the method moves to step 540, where normal operation may be resumed. The method then ends.

Referring back to step 520, if the internal states of the first and at least one further signal processing logic module are not matching, the method moves to step 550, where the mismatch is localized. Next, in step 555, data relating to the internal states of the signal processing logic module may be stored. The internal states of the signal processing logic module are then compared to those for previously detected faults, in step 560. In step 565 it is determined whether the mismatch may be due to a transient fault, for example if no previous, comparable internal state has caused a similar fault.

If it is determined that the mismatch may be due to a transient fault, the method moves to step 570, where the signal processing logic module are re-synchronized, before moving on to step 530 with the repeat of the failed operation. However, if it is determined that the mismatch may be not due to a transient fault, for example if a previous, comparable internal state has caused a similar fault, the method moves to step 575 with the transition to a safe state. The method then ends.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The semiconductor substrate described herein can be any semiconductor material or combinations of materials, such as gallium arsenide, silicon germanium, silicon-on-insulator (SOI), silicon, monocrystalline silicon, the like, and combinations of the above.

The conductors and signals as discussed herein may be illustrated or described in reference to being a single conductor, a plurality of conductors, unidirectional conductors, or bidirectional conductors. However, different examples may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above examples, as applicable, may be implemented using a variety of different information processing systems. For example, although FIG. 1 and the discussion thereof describe an exemplary data processing system, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative examples may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Also for example, in one example, the illustrated elements of system 100 are circuitry located on a single integrated circuit or within a same device. Alternatively, system 100 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative examples may include multiple instances of a particular operation, and the order of operations may be altered in various other examples.

In one example, system may be a computer system such as a personal computer system. Other examples may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A system comprising:
   a first signal processor and a second signal processor, each of the first and second signal processor comprises a plurality of flip-flop elements arranged to form a scan chain when the respective signal processor is configured to operate in a mismatch handling mode; and
   a mismatch handler logic module, the mismatch handler logic module to detect a mismatch between outputs of the first and second signal processor, the mismatch between outputs indicating a failed operation, the mismatch handler logic further comprising:
      a first state analyzer logic module operably coupled to the first signal processor, and a second state analyzer logic module operably coupled to the second signal processor, wherein in response to detection of the mismatch the first and second state analyzer logic module are to analyze an internal state of the first and second processors respectively and are to generate a state signature value for the first and second signal processor respectively based at least on states of the respective plurality of flip-flop elements and to,
   upon determination that the cause of the output mismatch is due to a transient fault, to re-synchronize the first and second signal processors.

2. The system of claim 1 wherein each of the first and second state analyzer logic module is arranged to receive state pre-processing configuration information, the state pre-processing configuration information substantially defining how the state analyzer logic generates the state signature value.

3. The system of claim 1 wherein the mismatch handler logic module is arranged, upon a comparison of state signature values of the first signal processor and the second signal processor determining matching internal states for the first and second signal processors, to cause the first and second signal processors to re-execute the failed operation.

4. The system of claim 3 wherein, upon re-execution of the failed operation, if the mismatch handler logic module detects a further mismatch between outputs of the first and second signal processor, the mismatch handler is further arranged to determine that the output mismatch is not due to a transient fault.

5. The system of claim 1, wherein the first and second state analyzer logic module are arranged, upon a comparison of state signature values of the first and second signal processor determining mismatching internal states for the first and second signal processors, to determine whether the mismatch within the first and second signal processor, and thereby the output mismatch, is caused by a transient fault.

6. The system of claim 5 wherein, upon a comparison of internal states of the first and second signal processor determining mismatching internal states for the first and second signal processor, at least one of the first and second state analyzer logic module is arranged to re-load its respective signal processor with state values in order to re-synchronize the signal processor.

7. The system of claim 1 wherein the mismatch handler logic module further comprises sequence copy logic module, operably coupled to an input of a scan chain for each of the first and second signal processor, and arranged to introduce a sequence of state values into the input of the scan chains to re-synchronize the signal processor.

8. The system of claim 7 wherein the sequence copy logic module is further operably coupled an output of at least one of the scan chains for the signal processor, and arranged to introduce a sequence of state values from the output of the at least one scan chain into the of the scan chains to re-synchronize the signal processor.

9. The system of claim 1 wherein, upon determination that the output mismatch was not caused by a transient fault, the mismatch handler logic module is further arranged to cause the system to transition into a safe state.

10. A semiconductor device comprising the system of claim 1.

11. A system comprising:
   a first signal processor and a second signal processor; and
   a first state analyzer logic module operably coupled to the first signal processor and a second state analyzer logic module operably coupled to the second signal processor, wherein upon detecting mismatching internal states for the first and second signal processors, each of the first and second state analyzer logic module are arranged to:
      compare information relating to the internal state of the respective signal processor with information relating to internal states from previously detected internal mismatches; and
      if a comparable mismatch has not previously been detected, to determine the that the mismatch within the first and second signal processor, and thereby the output mismatch, is caused by a transient fault.

12. The system of claim 11 wherein, upon a comparison of internal states of the first and second signal processor determining mismatching internal states for the first and second signal processor, each of the first and second state analyzer logic module is arranged to identify a location of fault causing the mismatch within the first and second signal processor.

13. A method comprising:
- detecting a mismatch between outputs of a first signal processor and a second signal processor that is an indication of a failed operation;
- in response to detecting the mismatch, comparing an internal state of the first signal processor and an internal state of the second signal processor to determine mismatching internal states;
- in response to determining the mismatching internal states, comparing information relating to the internal state of the respective first and second signal processor with information relating to internal states of the first and second signal processor from previously detected internal mismatches to determine if a comparable mismatch between internal states has been previously detected; and
- in response to determining a comparable mismatch between internal states has not previously been detected, determining that the mismatching internal state between the first and second signal processors, and thereby the mismatch between outputs, is caused by a transient fault.

14. The method of claim 13, wherein comparing the internal state of the first signal processor and the internal state of the second signal processor includes receiving the internal state of the first signal processor from a scan chain of the first signal processor, and receiving the internal state of the second signal processor from a scan chain of the second signal processor.

15. The method of claim 13, wherein comparing the internal state of the first signal processor and the internal state of the second signal processor includes generating a state signature value for the first signal processor, and generating a state signature value for the second signal processor.

16. The method of claim 13, further comprising:
- transitioning the system to a safe state in response to determining that the mismatching internal state between the first and second signal processors, and thereby the mismatch between outputs, is not caused by a transient fault.

* * * * *